(12) United States Patent
Smolenski et al.

(10) Patent No.: US 6,849,834 B2
(45) Date of Patent: Feb. 1, 2005

(54) APPARATUS FOR CYCLE-SKIPPING POWER CONTROL

(75) Inventors: Joseph Lucian Smolenski, Slingerlands, NY (US); Harry Kirk Mathews, Jr., Clifton Park, NY (US); Walter Whipple, III, Amsterdam, NY (US); George Charles Goodman, Niskayuna, NY (US); John Stanley Glaser, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 432 days.

(21) Appl. No.: 10/000,275

(22) Filed: Nov. 2, 2001

(65) Prior Publication Data

US 2003/0085221 A1 May 8, 2003

(51) Int. Cl.[7] .................................................. H05B 1/02
(52) U.S. Cl. ........................ 219/501; 219/497; 219/492; 219/486; 323/319
(58) Field of Search ................................. 219/501, 505, 219/492, 499, 497, 506, 412–414, 481, 486; 307/117, 39–41; 323/319, 335, 336

(56) References Cited

U.S. PATENT DOCUMENTS

| | | | | | |
|---|---|---|---|---|---|
| 4,737,617 A | * | 4/1988 | Payne | ......................... | 219/486 |
| 6,018,151 A | * | 1/2000 | Hirst | ........................... | 219/497 |
| 6,246,034 B1 | * | 6/2001 | Glaser et al. | ................ | 219/501 |
| 6,246,831 B1 | * | 6/2001 | Seitz et al. | .................. | 392/486 |
| 6,541,740 B2 | * | 4/2003 | Ziaimehr et al. | ........... | 219/486 |
| 6,624,396 B2 | * | 9/2003 | Witt et al. | ................... | 219/497 |

FOREIGN PATENT DOCUMENTS

DE         3 601 555    *   7/1987

* cited by examiner

*Primary Examiner*—Mark Paschall
(74) *Attorney, Agent, or Firm*—Fletcher Yoder

(57) ABSTRACT

In one embodiment of the present invention, a power controller for an AC load comprises: a user interface adapted to interact with a user to produce at least one user interface signal; and a control module adapted to electrically couple a line voltage supply, electrically couple the AC load, and provide electrical power to the AC load as a function of the at least one user interface signal by implementing a low-flicker, cycle-skipping control algorithm, the control algorithm comprising a plurality of cycle patterns, the cycle patterns comprising a plurality of main power levels.

48 Claims, 7 Drawing Sheets

APPARATUS FOR CYCLE-SKIPPING POWER CONTROL

CROSS REFERENCE TO RELATED APPLICATIONS

This application is related to commonly assigned Mathews et al., "Method And Apparatus For Controlling Temperature," Non-U.S. Patent Number 6,713,732 and which is herein incorporated by reference.

BACKGROUND

The present invention relates to cycle-skipping control for alternating current (AC) line-powered loads, particularly for providing increased control resolution while maintaining low flicker levels at any control setting.

Cycle-skipping control is also known as cycle-stealing control or integral cycle control. As generally used herein, these terms will also refer to ½ cycle control, since it will be understood by those of ordinary skill in the art that an integral cycle control can be modified to provide ½ cycle control.

Cycle-skipping control is often used to control high power electrical loads for which the response time constant is much longer than the period of the AC line used to power the load. An exemplary load is a kitchen range with electrical resistance burners wherein the thermal time constant may be on the order of one second or greater. Cycle-skipping control has the advantage that the power control switch is turned on and off when the load current and voltage are zero. As a result, electromagnetic interference generated by the switching action is essentially eliminated, and electrical stress on the switches is reduced, thereby increasing reliability.

Disadvantageously, however, cycle-skipping control produces pulsating currents in the electrical mains that supply the power to the system. Such current pulses result in voltage fluctuations, due to the power source impedance, which may have detrimental effects on other loads connected to the same electrical mains. In particular, if the other loads are used for lighting purposes, for example, visible flicker and associated human sensitivity may result. Additionally, flicker may cause problems in the controlled load if the controlled load radiates visible light, e.g., as in a radiant electric burner.

Flicker problems in a visibly radiant load usually worsen as finer control resolution is required. Typical cycle-skipping control methods rely on skipping a certain percentage of cycles in a given control period. Hence, as power control resolution is increased, a greater number of cycles is needed in the control period. As the control period approaches the visual time constant of the load, visible flicker ensues.

Phase control is an alternative type of control method that eliminates the flicker problem described hereinabove, but has drawbacks of inherently generating radio frequency interference and presenting a reactive load to the AC line. Steps can be taken to alleviate these problems, but such steps add expense, mass and bulk to the controller. Another alternative type of control technique is to use a regulated switch-mode power supply, but such a power supply is typically prohibitively expensive.

Accordingly, it is desirable to provide a cycle-skipping control with increased control resolution. It is further desirable that such a cycle-skipping control minimize perceptible flicker in both electrical lighting loads in proximity to the controlled load, as well as in the controlled load itself if the controlled load radiates visible light.

SUMMARY

In one embodiment of the present invention, a power controller for an AC load comprises: a user interface adapted to interact with a user to produce at least one user interface signal; and a control module adapted to electrically couple a line voltage supply, electrically couple the AC load, and provide electrical power to the AC load as a function of at least one user interface signal by implementing a low-flicker, cycle-skipping control algorithm, the control algorithm comprising a plurality of cycle patterns, the cycle patterns comprising a plurality of main power levels.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
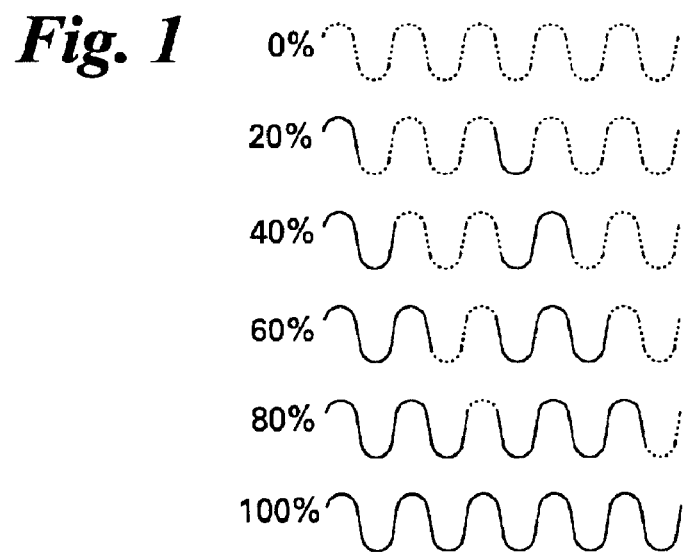
FIG. 1 illustrates exemplary AC line cycle-skipping main-level or core patterns.

Control algorithms described herein refer particularly to an electrical resistance heater. It is to be understood, however, that the principles of the control algorithms apply equally to other applications employing cycle-skipping algorithms.

An ideal radiant electrical resistance heater appears to provide a continuous glow to the human eye. In practice however, some flicker results with the effects of flicker depending on the amplitude and frequency of the flicker. Human sensitivity has a bandpass frequency response characteristic with a pass band in a range of about 6–12 Hz and a peak at about 8.5 Hz.

In practice, the appearance of a continuous radiant heater glow can be obtained if the minimum frequency of power pulses to the heater is higher than about 12 Hz. Control resolution and minimum pulse rate are inversely proportional, so the maximum resolution that can be obtained for a line frequency of 60 Hz is about 10% of full power if integral half-cycle skipping is employed. For improved power control accuracy, a resolution of 2% or better is desired, but such resolution would likely result in some variation in the heater output. To achieve the smoothest heater appearance, control pulses can be evenly spaced, but with such spacing some power levels would cause pulse frequencies in the human sensitivity range of 6–12 Hz. As these frequencies modulate the AC power line, high levels of flicker would be generated in the room lighting. One solution to room lighting flicker is to push the lower frequencies to be much less than 6 Hz, but such lower frequencies would be visible in the heater.

In accordance with embodiments of the present invention, power control signal patterns are provided to optimize the tradeoffs set forth hereinabove. The power control patterns are based on generating core cycle patterns corresponding to main power levels and alternating between the core cycle patterns in order to provide finer control levels. In an exemplary embodiment, the core cycle patterns are determined based on control pulse frequency, spacing between the main power levels, overall control bandwidth, and net DC (direct current) component.

Frequency of the control pulses directly affects the perceived flicker level in that flicker level and control pulse frequency are inversely proportional. The limit on pulse frequency is determined by the frequency of the AC line because if switching occurred at a frequency greater than that of the AC line, switching would no longer occur at zero-crossings of voltage and current, resulting in losses.

Spacing between the main power levels also directly affects flicker. As the levels get closer, the resolution becomes finer, to the point where the frequency components become lower and more perceptible as flicker, since resolution and pulse frequency are inversely proportional in a cycle-skipping control scheme.

Control bandwidth is a measure of how quickly the power level can be adjusted. Control bandwidth also affects flicker.

FIG. 1 illustrates one exemplary set of core cycle patterns 60 as disclosed in commonly assigned Glaser et al, "Multi-Period Cycle-Skipping For Low Flicker, Fine-Resolution Power Control," U.S. Pat. No. 6,246,034 which are used in one embodiment of the present invention. In particular, the core cycle patterns of FIG. 1 comprise five core levels at 20%, 40%, 60%, 80% and 100%. In FIG. 1, the solid portions of the waveforms represent AC line cycles applied to the heater, i.e., the on-cycles; and the dotted lines represent off-cycles. Assuming a 60 Hz line voltage supply 40 (FIG. 4), the five-level core set of FIG. 1 has flicker frequency components at 24 Hz, which are not visible in the heater and which generate low levels of room lighting flicker.

Figure 2:
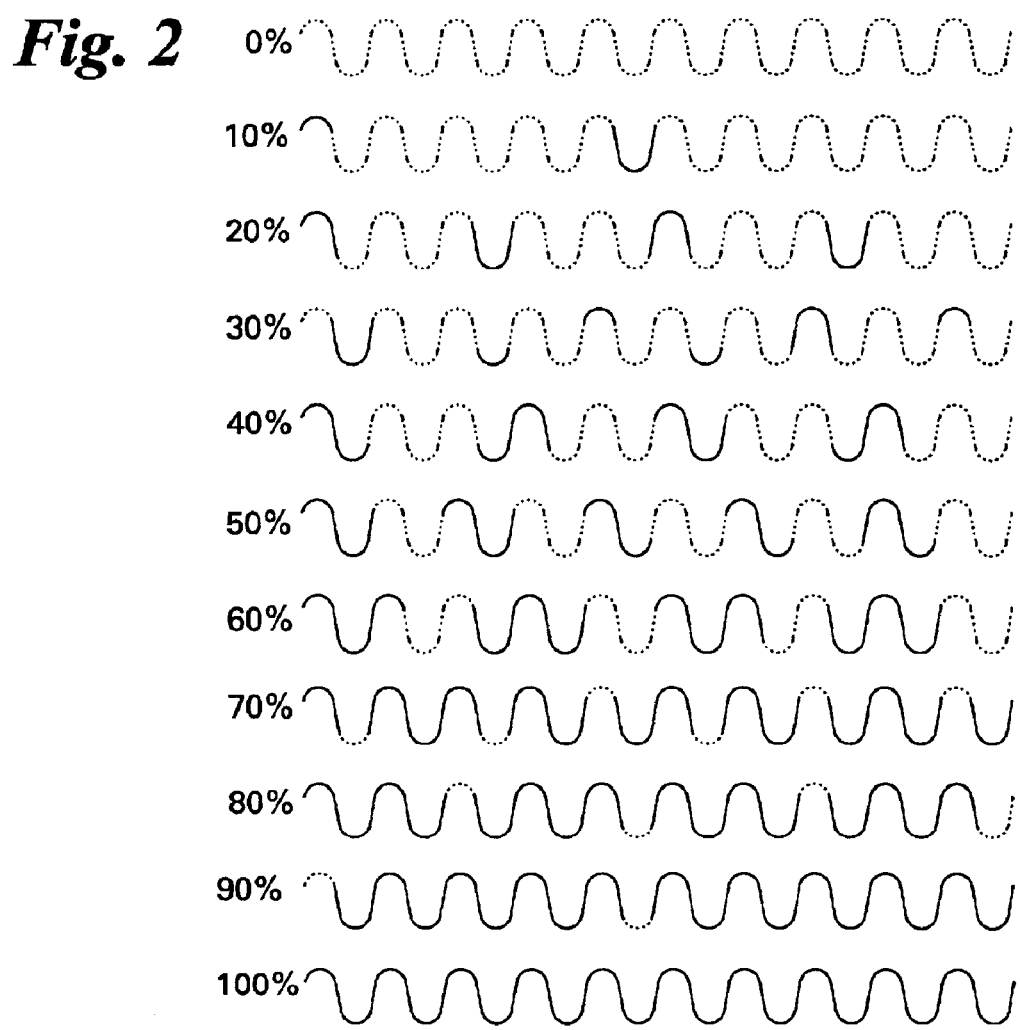
FIG. 2 illustrates other exemplary AC line cycle-skipping main-level or core patterns.

FIG. 2 illustrates another exemplary set of core cycle patterns 60 (also disclosed in aforementioned U.S. Pat. No. 6,246,034) for use in accordance with another embodiment of the present invention. In particular, the core cycle patterns of FIG. 2 comprise ten core levels at 10%, 20%, 30%, 40%, 50%, 60%, 70%, 80%, 90% and 100%. The ten-level core set has frequency components at 12 Hz or above, which are unlikely to be visible in the heater itself, but which have the potential to generate moderate to large line flicker levels.

For finer power control, the control alternates between the main levels of the core cycle patterns 60. One embodiment (also disclosed in aforementioned U.S. Pat. No. 6,246,034) involves alternating between main levels on a fixed period basis, the fixed period being referred to as $T_{fine}$. The fixed period $T_{fine}$ is equal to an integer multiple of the main level pattern. Both flicker and control bandwidth drive the value of $T_{fine}$. An exemplary period $T_{fine}$ is 1–2 seconds with $T_{fine}=1$ sec yielding a faster response and a higher flicker than $T_{fine}=2$ sec for one example.

Figure 3:
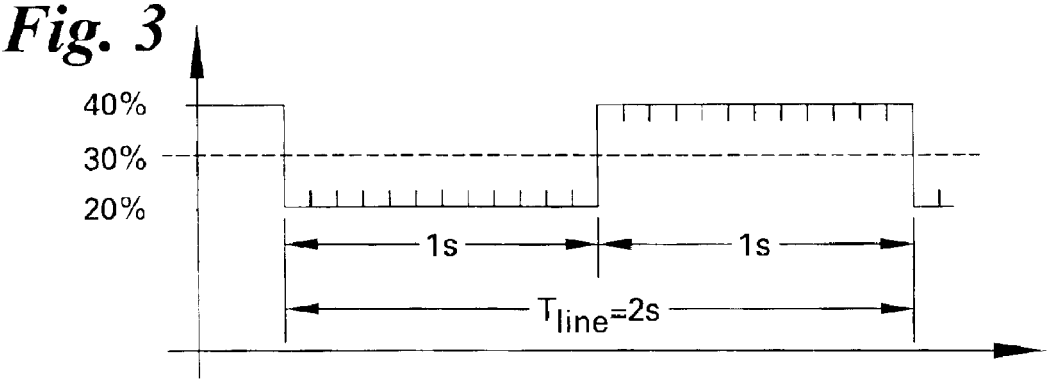
FIG. 3 illustrates a graph showing cycle pattern timing for fine power control by alternating between main levels.

For example, for the five-level set of core cycle patterns (FIG. 1) and a fine control period $T_{fine}=2$ seconds, 24 cycle patterns can fit within that time period, resulting in 120 levels (not counting the 0% level). In order to generate 30% level control with this scheme, the 20% level can be employed for 1 second and the 40% level for 1 second. FIG. 3 illustrates such a control wherein the small ticks in the graph represent the duration of the main-level cycle patterns shown in FIG. 2. For the example of FIG. 3, there is a low-frequency component of 0.5 Hz in addition to the high-frequency component of the main levels. The lower frequency component will be visible in the heater. Using 10% core levels (FIG. 2) results in less visible variation than the 20% levels (FIG. 1).

Another alternative is to interleave the different core cycle patterns (e.g., of FIGS. 1 and 2) and to use the minimum number of cycle patterns necessary to generate the needed levels. The result is a smoother heater appearance, but substantially higher line flicker levels.

Each of core cycle patterns 60 of FIGS. 1 and 2 has no net DC component. "No net DC component" means each core cycle pattern 60 has substantially the same number of positive and negative half cycles. This is not a control requirement, but is practical, particularly for applications having moderate to high load power, such as many household appliances. In particular, drawing even a relatively small DC current in household appliances can cause a detrimental flux imbalance in the local distribution transformer.

As defined herein, a "low flicker, cycle-skipping control algorithm" is a cycle skipping control algorithm as described hereinabove comprising a plurality of cycle patterns 60, the cycle patterns 60 comprising a plurality of main power levels; a "fine resolution control algorithm" is a low flicker, cycle-skipping control algorithm as described hereinabove comprising cycle patterns 60 as well as a scheme for alternating among the main power levels to provide finer resolution.

Figure 4:
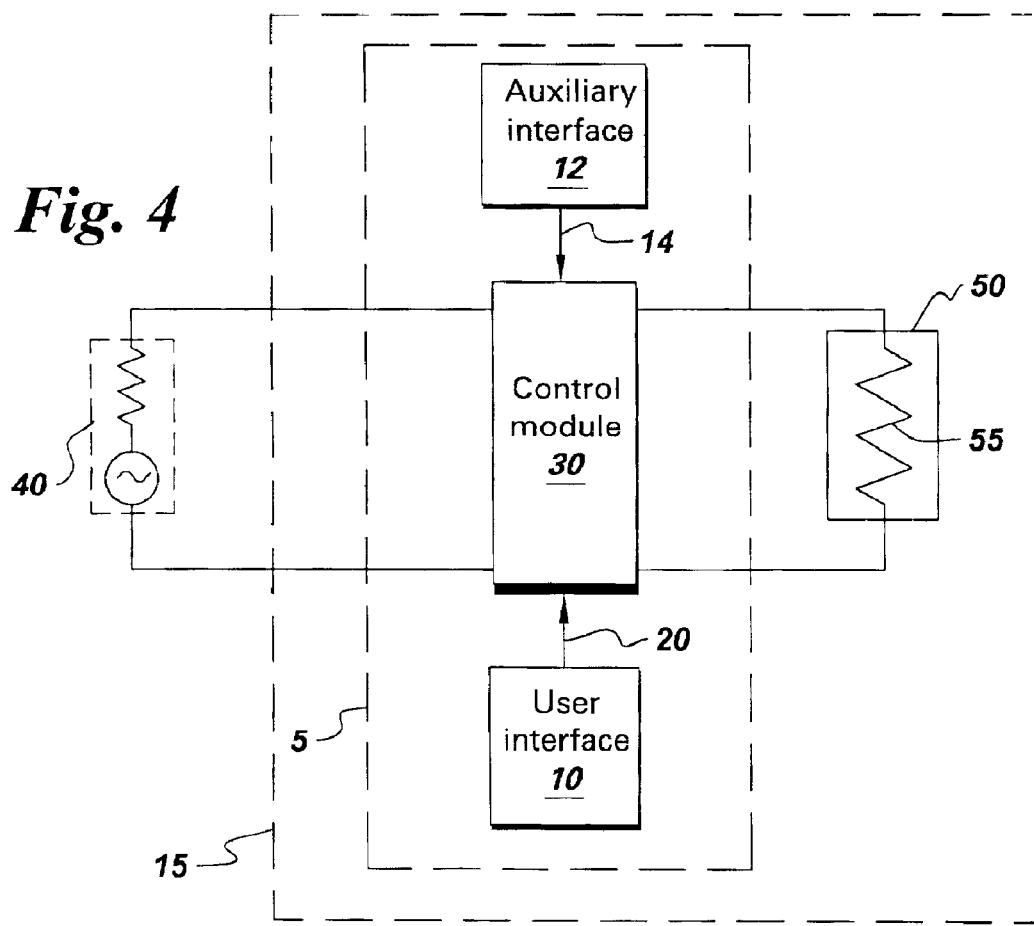
FIG. 4 illustrates a schematic view of an electric cooking appliance and a power controller in accordance with one embodiment of the present invention.

FIG. 4 illustrates a power controller 5 for cycle-skipping control of an AC load 50 in one embodiment of the present invention. Power controller 5 comprises a user interface 10 and a control module 30. In operation, a user interacts with user interface 10 to produce user interface signals 20. Control module 30 electrically couples a line voltage supply 40, electrically couples AC load 50, and provides electrical power to AC load 50 as a function of user interface signals 20 by implementing a low-flicker, cycle-skipping control algorithm.

In alternative embodiments, power controller 5 further comprises an auxiliary interface 12 which produces an auxiliary interface signal 14. Typically, auxiliary interface 12 couples various auxiliary sensors (not shown) to control module 30. Examples of such auxiliary sensors include, without limitation, devices for sensing: cooking vessel presence, for inhibiting heating in the absence of a cooking vessel so as to enhance safety and save energy; cooktop temperature, for protecting a cooktop from overheating; pan temperature, for protecting a pan from overheating; and food temperature, for automatic recipe following and protecting food from overcooking.

Whereas FIG. 4 and subsequent figures illustrate embodiments of the present invention for controlling a single AC load 50, it will be obvious to one of ordinary skill in the art that power controller 5 may control multiple AC loads 50 either by comprising multiple control modules 30, or by having one or more control modules 30 control multiple AC loads 50, or both. Likewise, power controller 5 may comprise multiple user interfaces 10 and may have one or more user interfaces 10 correspond to multiple AC loads 50. As used herein, therefore, "a", "an", or "one" are understood to mean "at least one"; "two" is understood to mean "at least two"; and so forth.

In some embodiments of the present invention, power controller 5 is sized to allow direct replacement of a conventional electric range electromechanical heater controller (sometimes referred to as an "infinite switch"). In such direct replacement embodiments, power controller 5 controls "exactly one" AC load 50 (or cooking element 55). As used herein, the term "exactly one" is understood to mean "one, and only one"; "exactly two" is understood to mean "two, and only two"; and so forth.

As defined herein, "user" refers to any external agency seeking to operate power controller 5. Examples of users include, without limitation, people and mechanical, electrical, or electronic devices. By way of example, but not limitation, user interface 10 may comprise a control knob, a mechanical slider, a set of mechanical push buttons, a touch panel, or a set of membrane switches; user interface signal 20 may comprise mechanical signals transmitted, for example, as shaft angles or linkage positions; electrical signals transmitted, for example, as voltages or currents; or radiative signals transmitted, for example, as optical, infrared, or radio frequency electromagnetic radiation.

Line voltage supply 40 comprises any source of AC electrical power, examples of which include, without limitation, alternators, inverters, and couplings to residential or industrial power distribution networks. In typical embodiments, line voltage supply 40 may comprise a household electrical outlet operating at, for example, 110, 204 or 208 VAC (volts alternating current, i.e., 110 VAC denotes a root mean square voltage of 110V).

AC load 50 comprises any electrical load that can tolerate an AC voltage component. Examples of AC loads include, without limitation, light bulbs, AC motors, and resistance heaters. In typical embodiments, AC load 50 may comprise a cooking element in, for example, an electric range, stove or radiant cooktop.

In another embodiment of the present invention, FIG. 4 also illustrates an electric cooking appliance 15 comprising power controller 5 and AC load 50 wherein AC load 50 comprises a cooking element 55.

Figure 5:
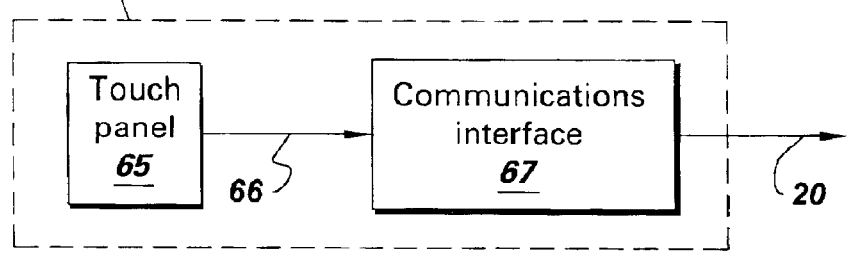
FIG. 5 illustrates a schematic view of a more specific embodiment of a user interface in accordance with the embodiment of FIG. 4.

In accordance with the embodiment of FIG. 4, FIG. 5 illustrates a more specific embodiment of user interface 10 comprising a touch panel 65 and a communications interface 67. A user interacts with touch panel 65 so as to generate at least one touch signal 66. Communications interface 67 receives touch signal 66 and generates at least one user interface signal 20.

Figure 6:
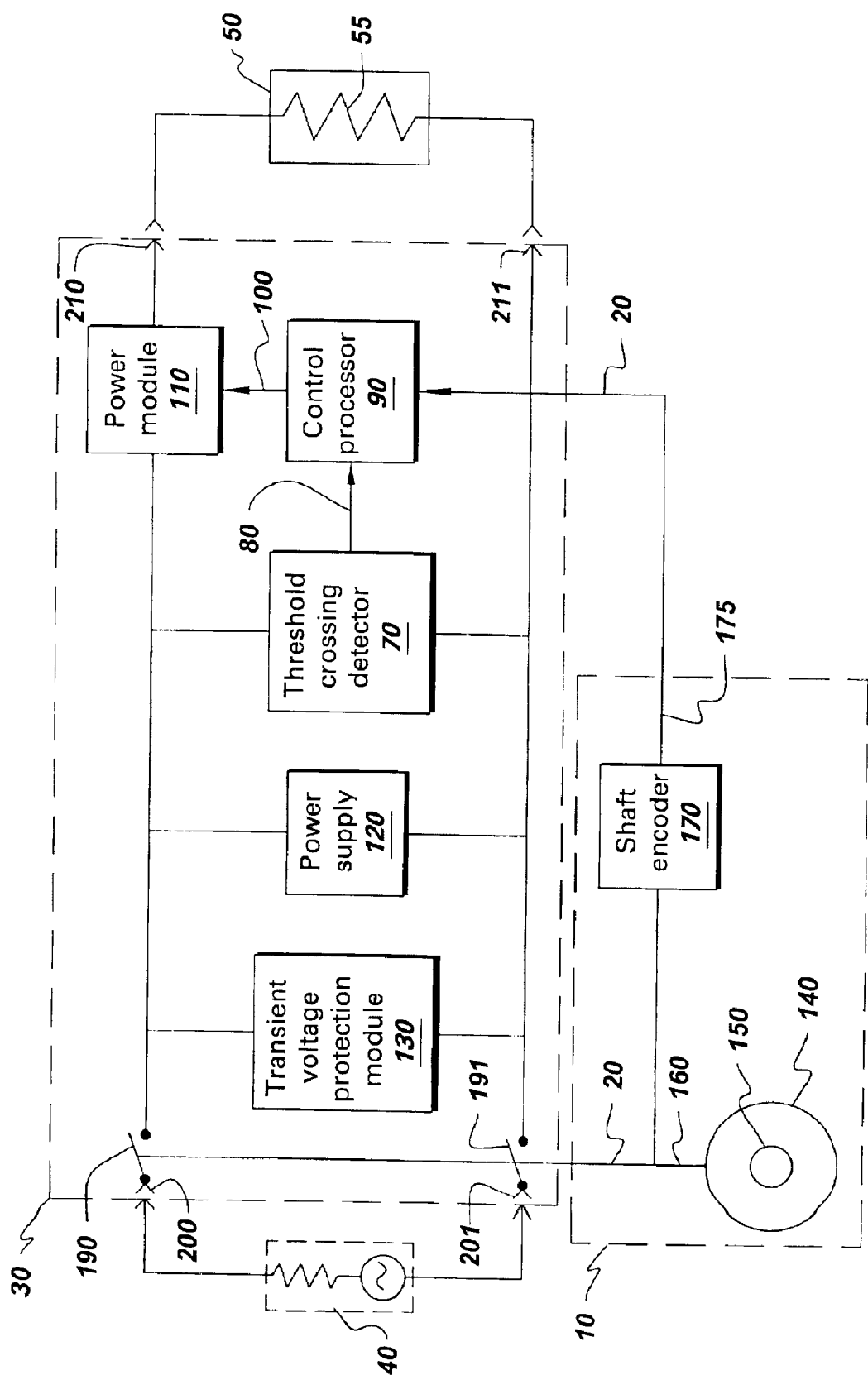
FIG. 6 illustrates a schematic view of a more specific embodiment of a power controller in accordance with the embodiment of FIG. 4.

FIG. 6 illustrates a more specific embodiment in accordance with FIG. 4 in which control module 30 comprises: a power supply 120; a transient voltage protection module 130; two electrical switches 190, 191; two line voltage supply connectors 200, 201; two load connectors 210, 211; a threshold-crossing detector 70; a control processor 90; and a power module 110. Power supply 120 electrically couples line voltage supply 40 and provides signal-level operating power at a regulated supply voltage to power controller 5 (FIG. 4). Distribution of signal-level operating power among elements of power controller 5 is not shown. Transient voltage protection module 130 limits line voltage supply 40 to a specified safe voltage level. In response to a mechanical signal 160, electrical switches 190, 191 make or break electrical contact with line voltage supply 40. Line voltage supply connectors 200, 201 electrically couple line voltage supply 40, while load connectors 210, 211 electrically couple AC load 50. Whenever an output voltage of line voltage supply 40 crosses a specified voltage threshold, threshold-crossing detector 70 generates a threshold-crossing signal 80. Control processor 90 receives threshold-crossing signal 80 and at least one user interface signal 20 and generates a switch command signal 100 by implementing the low flicker, cycle-skipping control algorithm. As a function of switch command signal 100, power module 110 provides electrical power to AC load 50.

FIG. 6 also illustrates a more specific embodiment of user interface 10 comprising: a control knob 140, an input shaft 150, and a shaft encoder 170. Input shaft 150 mechanically couples control knob 140 and provides a mechanical signal 160 (i.e., a shaft angle) when turned by a user. Shaft encoder 170 generates a shaft angle signal 175 in response to mechanical signal 160. Examples of shaft encoder 170 include, without limitation, potentiometers, absolute or incremental optical shaft encoders, and magnetic shaft encoders.

Figure 7:
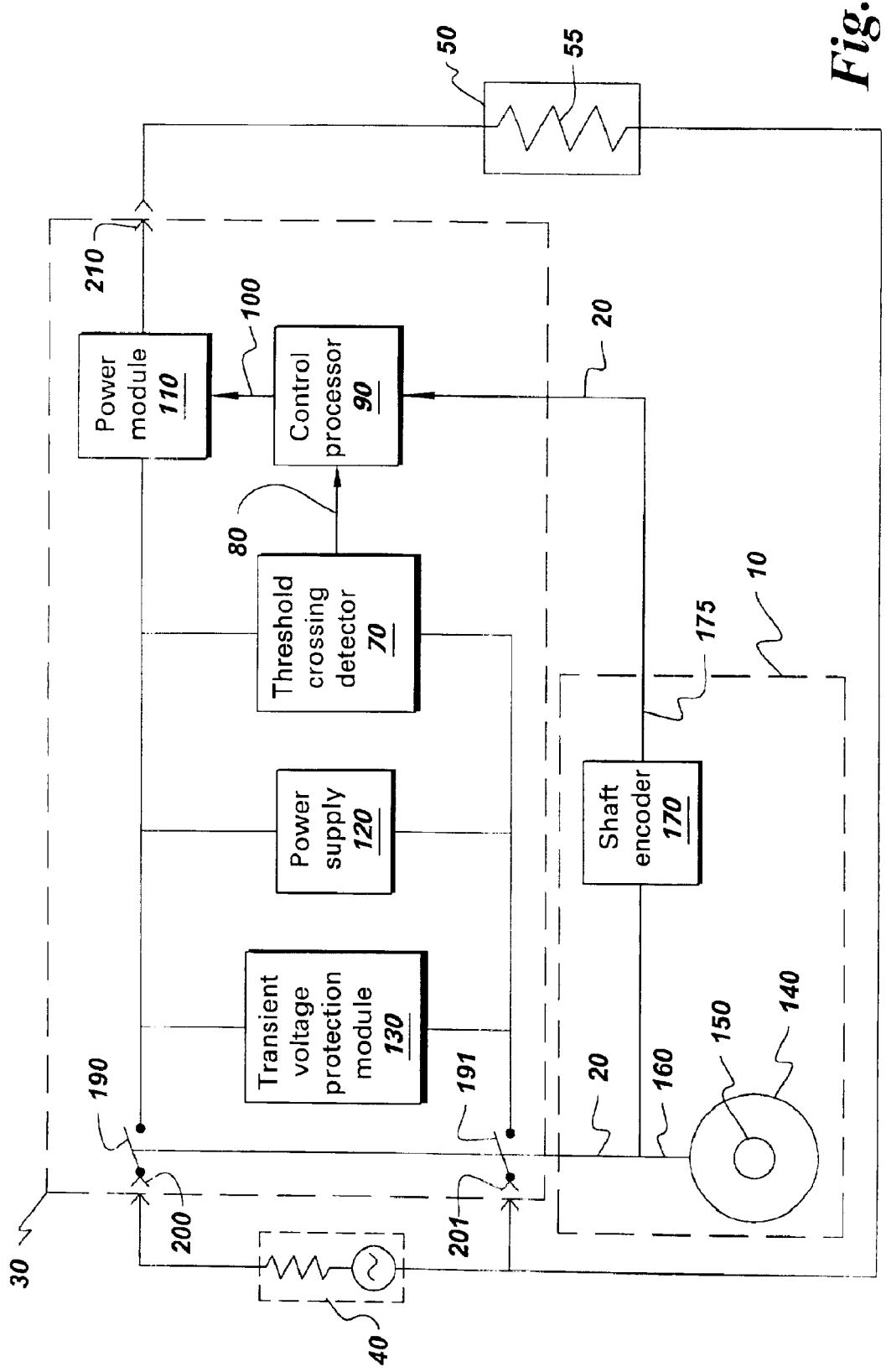
FIG. 7 illustrates a schematic view of an alternative specific embodiment of a power controller in accordance with the embodiment of FIG. 4.

FIG. 7 illustrates an alternative embodiment of control module 30 comprising exactly one load connector 210. The second load connector 211, present in FIG. 6, has been eliminated in favor of directly coupling one side of AC load 50 to one side of line voltage supply 40. For some applications, the embodiment of FIG. 7 provides an economic advantage over that of FIG. 6.

Figure 8:
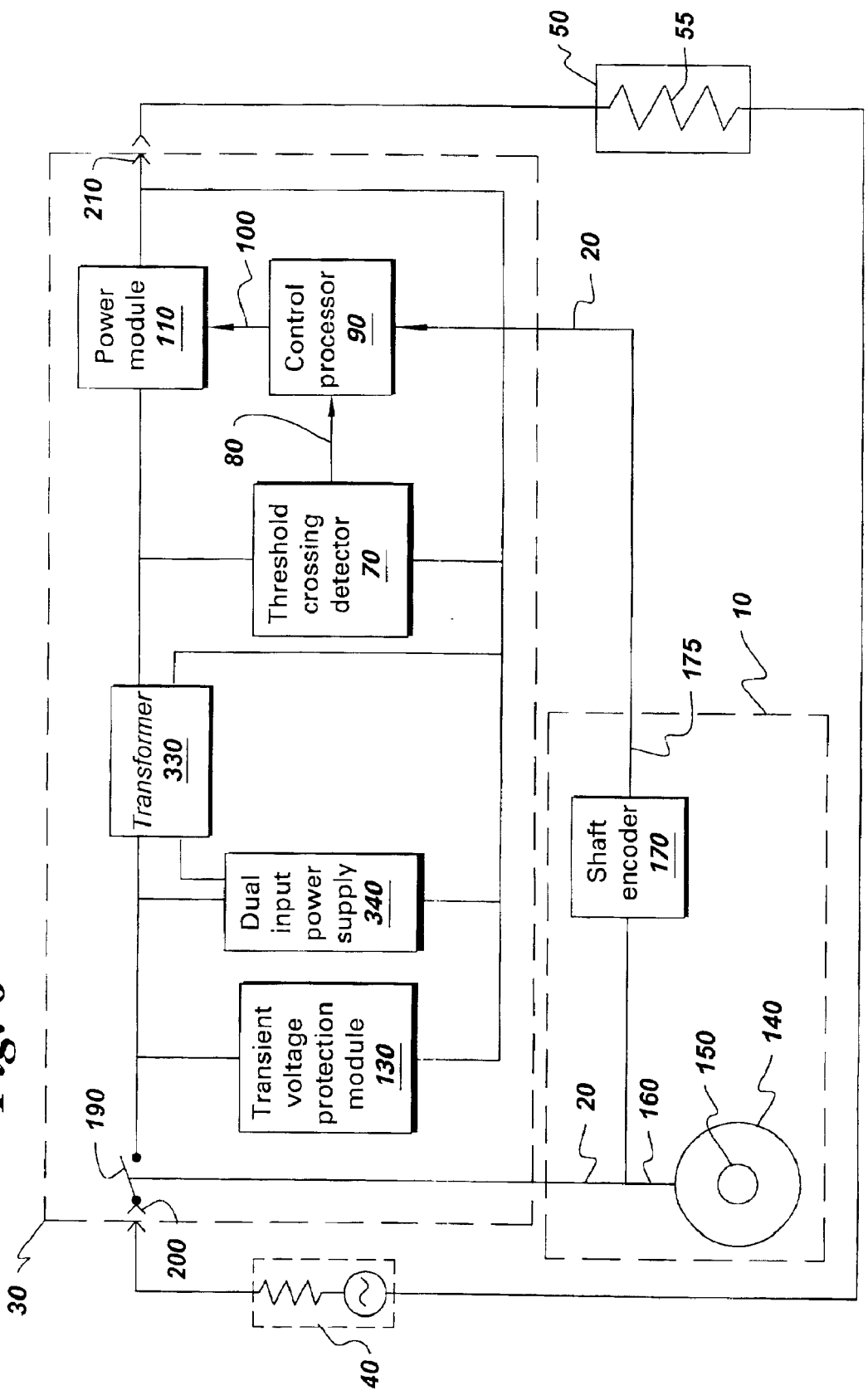
FIG. 8 illustrates a schematic view of another alternative specific embodiment of a power controller in accordance with the embodiment of FIG. 4.

Similarly, FIG. 8 illustrates an alternative embodiment of control module 30 comprising: exactly one load connector 210; exactly one line voltage supply connector 200; a transformer 330; and a dual input power supply 340. In contrast to the embodiment of FIG. 7, the second line voltage supply connector 201 has been eliminated. Whereas the embodiments of FIGS. 6 and 7 reference all voltages to the potential at line voltage supply connector 201, the embodiment of FIG. 8 references all voltages to the potential at load connector 210. Dual input power supply 340 provides signal-level operating power to power controller 5 (FIG. 4). Distribution of signal-level operating power among the elements of power controller 5 is not shown. When AC load 50 is not conducting current, the voltage across dual input power supply 340 is sufficient to supply the operating power. When AC load 50 is conducting current, however, dual input power supply 340 instead draws power from a secondary winding of transformer 330 for which purpose transformer 330 has a primary winding electrically coupled in series with line voltage supply 40 and AC load 50. For some applications, the embodiment of FIG. 8 provides an economic advantage over those of FIGS. 6 and 7.

Figure 9:
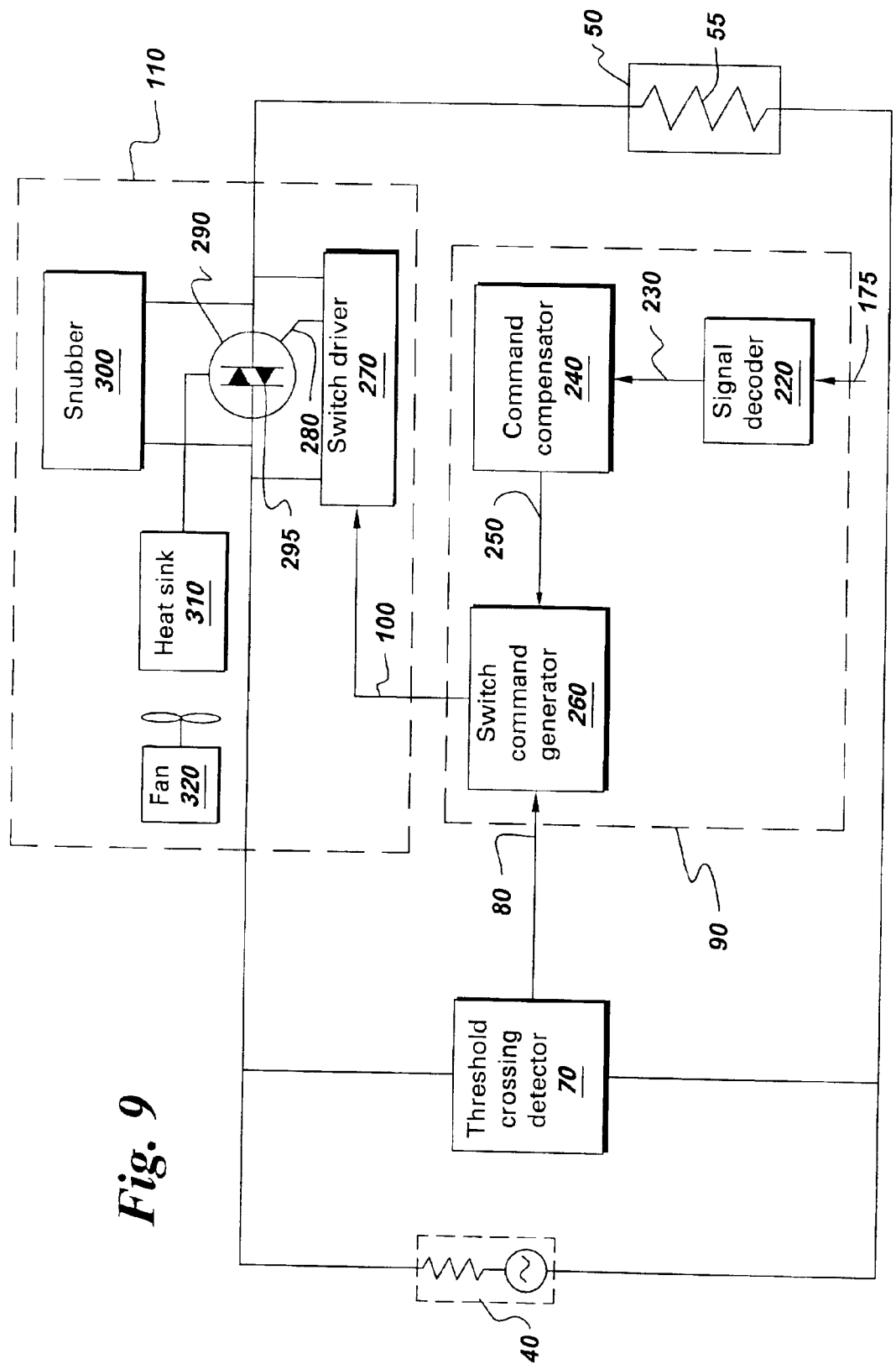
FIG. 9 illustrates a schematic view of a more specific embodiment of a control processor and a power module in accordance with the embodiment of FIG. 8.

FIG. 9 illustrates a schematic view of a more specific embodiment of control processor 90 comprising: a signal decoder 220; a command compensator 240; and a switch command generator 260. In operation, signal decoder 220 receives shaft angle signal 175 and generates a power command 230. If, for example, shaft encoder 170 comprises an incremental optical shaft encoder, then shaft angle signal 175 may comprise a train of incremental angle pulses and signal decoder 220 may comprise a counter to accumulate incremental angle pulses and produce an absolute shaft angle. Power command 230 may then be, for example, a linear or affine function of the absolute shaft angle. As another example, shaft encoder 170 may comprise a potentiometer, shaft angle signal 175 may comprise a potentiometer wiper voltage, and signal decoder 220 may comprise an analog-to-digital converter and a digital processor to produce power command 230 as a function of the digitized potentiometer wiper voltage.

Command compensator 240 generates a power reference signal 250 as a compensating function of power command 230. The compensating function depends on the particular application and includes static and dynamic compensating functions. Static compensating functions include, without limitation, linear, affine and non-linear functions intended, for example, to perform signal scaling or units conversion, or to provide a desired linear or non-linear steady state system behavior. Dynamic compensating functions include, without limitation, hysteresis and combinations of low pass, high pass, bandpass, and bandstop linear filters to provide a desired transient system behavior.

Switch command generator 260 receives power reference signal 250 and threshold-crossing signal 80 and implements the low-flicker, cycle-skipping control algorithm, or the fine resolution control algorithm to produce switch command signal 100. Power reference signal 250 is used to select one or more of cycle patterns 60 (FIGS. 1 and 2) and, in embodiments using the fine resolution control algorithm, to calculate a duty cycle for alternating between the selected cycle patterns 60. In typical embodiments, switch command signal 100 ideally comprises a binary signal, with changes of signal state occurring near power line zero voltage crossings. Threshold crossing signal 80 provides necessary timing information so that switch command generator 260 may appropriately initiate or inhibit changes to switch command signal 100.

FIG. 9 also illustrates a more specific embodiment of power module 110 comprising: a switch driver 270; a controllable switch 290; a snubber 300; a heat sink 310; and a fan 320. Switch driver 270 receives switch command signal 100 and generates a gate signal 280. Controllable switch 290 is electrically coupled in series with line voltage supply 40 and AC load 50 and responds to gate signal 280 by providing electrical power to AC load 50. Examples of controllable switches include, without limitation, mechanical and solid-state relays (SSRs) including SSRs comprising transistors and thyristors. As an example of a thyristor SSR, FIG. 9 shows a triac 295. In order to prevent spurious conduction that may be initiated by dynamic voltage components, snubber 300 is electrically coupled in parallel with controllable switch 290 and serves to reduce such dynamic voltage components. Heat sink 310 is thermally coupled to controllable switch 290 to help maintain a safe operating temperature, aided by an airflow provided by fan 320.

Figure 10:
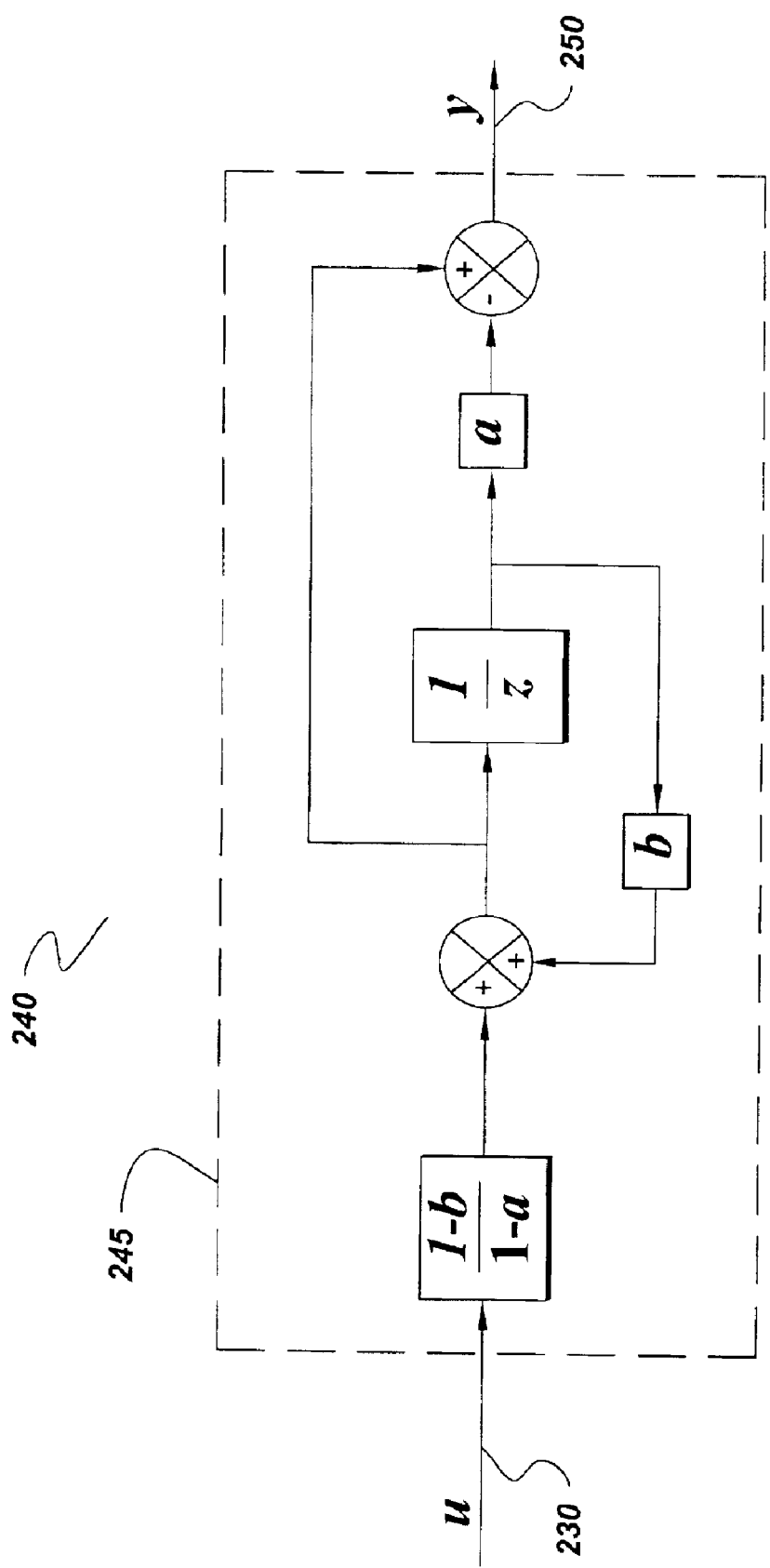
FIG. 10 illustrates a block diagram of a more specific embodiment of a command compensator in accordance with the embodiment of FIG. 9.

FIG. 10 is a control block diagram illustrating a dynamic compensator 245 as a specific embodiment of command compensator 240 in accordance with the embodiment of the present invention shown in FIG. 9. Dynamic compensator 245 is additionally described in aforementioned U.S. application No. TBD (applicant's docket number RD-29,143). Dynamic compensator 245 comprises a realization of a transfer function:

$$\frac{y}{u} = \left(\frac{1-b}{1-a}\right)\left(\frac{z-a}{z-b}\right)$$

where: y is power reference signal 250, u is power command 230, z is a unit sample advance operator (hence, $$\frac{1}{z}$$

is a unit sample delay operator), and a,b are dimensionless constants. In a typical embodiment of electric cooking apparatus 15 (FIG. 4), a,b are calculated as:

$$a = \exp(-T/\tau_1)$$
$$b = \exp(-T/\tau_2)$$

where $\tau_1$ is a thermal time constant (secs) of cooking element 55, $\tau_2$ is a desired system time constant (secs) and T is a compensator sampling time (secs). In control system terminology, dynamic compensator 245 cancels thermal time constant $\tau_1$ and substitutes desired system time constant $\tau_2$. Thus, in response to power command 230, whereas cooking element 55 would of itself exhibit a temperature time response governed by thermal time constant $\tau_1$, dynamic compensator 245 outputs reference signal 250 so that the temperature time response is instead governed by desired system time constant $\tau_2$. Alternative embodiments may set b=0, corresponding to the case where $\tau_2$ approaches zero.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A power controller for an AC load comprising:
   a user interface adapted to interact with a user to produce at least one user interface signal; and
   a control module adapted to electrically couple a line voltage supply, electrically couple said AC load, and provide electrical power to said AC load as a function of said at least one user interface signal by implementing a low-flicker, cycle-skipping control algorithm, said control algorithm comprising a plurality of cycle patterns, said cycle patterns comprising a plurality of main power levels, said control module comprising:
   a threshold-crossing detector adapted to generate a threshold-crossing signal whenever an output voltage of said line voltage supply crosses a specified voltage threshold;
   a control processor adapted to receive said at least one user interface signal and said threshold-crossing signal and generate a switch command signal by implementing said low-flicker, cycle-skipping control algorithm; and
   a power module adapted to receive said switch command signal and provide electrical power to said AC load.

2. The power controller of claim 1 further comprising an auxiliary interface adapted to interact with at least one auxiliary sensor to provide at least one auxiliary interface signal to said control module.

3. The power controller of claim 1 wherein said control module is adapted to electrically couple exactly one AC load and provide electrical power to said exactly one AC load.

4. The power controller of claim 1 wherein said low-flicker, cycle-skipping control algorithm comprises a fine resolution control algorithm.

5. The power controller of claim 1 wherein each of said cycle patterns has no net DC component.

6. The power controller of claim 1 wherein said main power levels are spaced substantially evenly.

7. The power controller of claim 1 wherein said user interface comprises:
a control knob;
an input shaft adapted to mechanically couple said control knob and provide a mechanical signal; and
a shaft encoder adapted to generate said user interface signal in response to said mechanical signal.

8. The power controller of claim 1 wherein said user interface comprises:
a touch panel adapted to interact with said user and provide at least one touch signal; and
a communications interface adapted to receive said at least one touch signal and generate said at least one user interface signal.

9. The power controller of claim 1 wherein said control module further comprises a power supply adapted to electrically couple said line voltage supply and provide signal-level operating power to said power controller.

10. The power controller of claim 1 wherein said control module further comprises a transient voltage protection module adapted to limit said line voltage supply to a specified safe voltage level.

11. The power controller of claim 1 wherein said control module further comprises at least one electrical switch adapted to make or break electrical contact with said line voltage supply in response to said user interface signal.

12. The power controller of claim 1 wherein said control module further comprises at least one line voltage supply connector adapted to electrically couple said line voltage supply.

13. The power controller of claim 1 wherein said control module further comprises at least one load connector adapted to electrically couple said AC load.

14. The power controller of claim 1 wherein said control module further comprises:
exactly one load connector adapted to electrically couple said AC load; and
exactly two line voltage supply connectors adapted to electrically couple said line voltage supply.

15. The power controller of claim 1 wherein said control module further comprises:
exactly one load connector adapted to electrically couple said AC load;
exactly one line voltage supply connector adapted to electrically couple said line voltage supply;
a transformer having a primary winding electrically coupled in series with said line voltage supply and said AC load; and
a dual input power supply adapted to electrically couple said line voltage supply, electrically couple a secondary winding of said transformer, and provide signal-level operating power to said power controller.

16. The power controller of claim 1 wherein said control processor comprises:
a signal decoder adapted to receive said user interface signal and generate a power command;
a command compensator adapted to receive said power command and generate a power reference signal; and
a switch command generator adapted to receive said power reference signal and said threshold-crossing signal and generate said switch command signal by implementing said low-flicker, cycle-skipping control algorithm.

17. The power controller of claim 16 wherein said command compensator comprises a dynamic compensator.

18. The power controller of claim 1 wherein said power module comprises:
a switch driver adapted to receive said switch command signal and generate a gate signal; and
a controllable switch electrically coupled to said line voltage supply and said AC load and adapted to provide electrical power to said AC load as a function of said gate signal.

19. The power controller of claim 18 wherein said controllable switch comprises a triac.

20. The power controller of claim 18 wherein said power module further comprises a snubber electrically coupled to said controllable switch.

21. The power controller of claim 18 wherein said power module further comprises a heat sink thermally coupled to said controllable switch.

22. The power controller of claim 21 wherein said power module further comprises a fan adapted to provide an airflow over said heat sink.

23. A power controller for use as a direct replacement for an electric range electromechanical heater controller, said power controller comprising:
an input shaft adapted to mechanically couple a control knob and provide a mechanical signal;
a shaft encoder adapted to generate a user interface signal in response to said mechanical signal; and
a control module adapted to electrically couple a line voltage supply, electrically couple exactly one cooking element, and provide electrical power to said cooking element as a function of said user interface signal by implementing a low-flicker, cycle-skipping control algorithm, said control algorithm comprising a plurality of cycle patterns, said cycle patterns comprising a plurality of main power levels, said control module comprising:
a threshold-crossing detector adapted to generate a threshold-crossing signal whenever an output voltage of said line voltage supply crosses a specified voltage threshold;
a control processor adapted to receive said at least one user interface signal and said threshold-crossing signal and generate a switch command signal by implementing said low-flicker, cycle-skipping control algorithm; and
a power module adapted to receive said switch command signal and provide electrical power to said cooking element.

24. The power controller of claim 23 wherein said control module further comprises a power supply adapted to electrically couple said line voltage supply and provide signal-level operating power to said power controller.

25. The power controller of claim 23 wherein said control module further comprises a transient voltage protection module adapted to limit said line voltage supply to a specified safe voltage level.

26. The power controller of claim 23 wherein said control module further comprises at least one electrical switch adapted to make or break electrical contact with said line voltage supply in response to said user interface signal.

27. The power controller of claim 23 wherein said control module further comprises at least one line voltage supply, connector adapted to electrically couple said line voltage supply.

28. The power controller of claim 23 wherein said control module further comprises at least one load connector adapted to electrically couple said cooking element.

29. The power controller of claim 23 wherein said control module further comprises:
   exactly one load connector adapted to electrically couple said cooking element; and
   exactly two line voltage supply connectors adapted to electrically couple said line voltage supply.

30. The power controller of claim 23 wherein said control module further comprises:
   exactly one load connector adapted to electrically couple said cooking element;
   exactly one line voltage supply connector adapted to electrically couple said line voltage supply;
   a transformer having a primary winding electrically coupled in series with said line voltage supply and said cooking element; and
   a dual input power supply adapted to electrically couple said line voltage supply, electrically couple a secondary winding of said transformer, and provide signal-level operating power to said power controller.

31. The power controller of claim 23 wherein said control processor comprises:
   a signal decoder adapted to receive said user interface signal and generate a power command;
   a command compensator adapted to receive said power command and generate a power reference signal; and
   a switch command generator adapted to receive said power reference signal and said threshold-crossing signal and generate said switch command signal by implementing said low-flicker, cycle-skipping control algorithm.

32. The power controller of claim 31 wherein said command compensator comprises a dynamic compensator.

33. The power controller of claim 23 wherein said power module comprises:
   a switch driver adapted to receive said switch command signal and generate a gate signal; and
   a controllable switch electrically coupled to said line voltage supply and said cooking element and adapted to provide electrical power to said cooking element as a function of said gate signal.

34. The power controller of claim 33 wherein said controllable switch comprises a triac.

35. The power controller of claim 33 wherein said power module further comprises a snubber electrically coupled to said controllable switch.

36. The power controller of claim 33 wherein said power module further comprises a heat sink thermally coupled to said controllable switch.

37. The power controller of claim 36 wherein said power module further comprises a fan adapted to provide an airflow over said heat sink.

38. An electric cooking apparatus comprising:
   a cooking element;
   a user interface adapted to interact with a user to produce at least one user interface signal; and
   a control module adapted to electrically couple a line voltage supply, electrically couple said cooking element, and provide electrical power to said cooking element as a function of said at least one user interface signal by implementing a fine resolution control algorithm, said control algorithm comprising a plurality of cycle patterns, said cycle patterns comprising a plurality of substantially equally spaced main power levels, each of said power levels having no net DC component, said control module comprising:
   a threshold-crossing detector adapted to generate a threshold-crossing signal whenever an output voltage of said line voltage supply crosses a specified voltage threshold;
   a control processor adapted to receive said at least one user interface signal and said threshold-crossing signal and generate a switch command signal by implementing said fine resolution control algorithm; and
   a power module adapted to receive said switch command signal and provide electrical power to said cooking element.

39. The electric cooking apparatus of claim 38 further comprising an auxiliary interface adapted to interact with at least one auxiliary sensor to provide at least one auxiliary interface signal to said control module.

40. The electric cooking apparatus of claim 38 wherein said user interface comprises:
   a control knob;
   an input shall adapted to mechanically couple said control knob and provide a mechanical signal; and
   a shaft encoder adapted to generate said user interface signal in response to said mechanical signal.

41. The electric cooking apparatus of claim 38 wherein said user interface comprises:
   a touch panel adapted to interact with said user and provide at least one touch signal; and
   a communications interface adapted to receive said at least one touch signal and generate said at least one user interface signal.

42. The electric cooking apparatus of claim 38 wherein said power module comprises a triac.

43. The electric cooking apparatus of claim 38 wherein said control module further comprises:
   a transformer having a primary winding electrically coupled in series with said line voltage supply and said cooking element; and
   a dual input power supply adapted to electrically couple said line voltage supply, electrically couple a secondary winding of said transformer, and provide signal-level operating power to said electric cooking apparatus.

44. An electric cooking apparatus comprising:
   a cooking element;
   a control knob;
   an input shaft adapted to mechanically couple said control knob and provide a mechanical signal;
   a shaft encoder adapted to generate a user interface signal in response to said mechanical signal;
   a power supply adapted to electrically couple a line voltage supply and provide signal-level operating power to said electric cooking apparatus;
   at least one electrical switch adapted to make or break electrical contact with said line voltage supply in response to said mechanical signal;
   at least one line voltage supply connector adapted to electrically couple said line voltage supply;
   at least one load connector adapted to electrically couple said cooking element;

a threshold-crossing detector adapted to generate a threshold-crossing signal whenever said output voltage of said line voltage supply crosses a specified voltage threshold;

a signal decoder adapted to receive said user interface signal and generate a power command;

a command compensator adapted to receive said power command and generate a power reference signal;

a switch driver adapted to receive a switch command signal and generate a gate signal;

a controllable switch electrically coupled to said line voltage supply and said cooking element and adapted to provide electrical power to said cooking element as a function of said gate signal;

a switch command generator adapted to receive said power reference signal and said threshold-crossing signal and generate said switch command signal by implementing a low-flicker, cycle-skipping control algorithm, said control algorithm comprising a plurality of cycle patterns, said cycle patterns comprising substantially equally spaced main power levels, and each of said cycle patterns having no net DC component.

45. The apparatus of claim 44 wherein said low-flicker, cycle-skipping control algorithm comprises a fine resolution control algorithm.

46. The apparatus of claim 44 wherein said controllable switch comprises a triac.

47. The apparatus of claim 44 comprising:

exactly one load connector adapted to electrically couple said cooking element; and exactly two line voltage supply connectors adapted to electrically couple said line voltage supply.

48. The apparatus of claim 44 comprising:

exactly one load connector adapted to electrically couple said cooking element;

exactly one line voltage supply connector adapted to electrically couple said line voltage supply; further comprising a transformer having a primary winding electrically coupled in series with said line voltage supply and said cooking element; and wherein said power supply comprises a dual input power supply adapted to electrically couple said line voltage supply, electrically couple a secondary winding of said transformer, and provide signal-level operating power to said electric cooking apparatus.

* * * * *